United States Patent
Denniel et al.

(10) Patent No.: US 7,243,716 B2
(45) Date of Patent: Jul. 17, 2007

(54) HEATED WINDABLE RIGID DUCT FOR TRANSPORTING FLUIDS, PARTICULARLY HYDROCARBONS

(75) Inventors: Sylvain Denniel, Aberdeen (GB); Neil Shaw Malone, Knutsford (GB)

(73) Assignee: Technip France (FR)

( * ) Notice: Subject to any disclaimer, the term of this patent is extended or adjusted under 35 U.S.C. 154(b) by 219 days.

(21) Appl. No.: 10/500,482

(22) PCT Filed: Dec. 26, 2002

(86) PCT No.: PCT/FR02/04566

§ 371 (c)(1),
(2), (4) Date: Jun. 28, 2004

(87) PCT Pub. No.: WO03/060368

PCT Pub. Date: Jul. 24, 2003

(65) Prior Publication Data

US 2005/0103489 A1    May 19, 2005

(30) Foreign Application Priority Data

Dec. 29, 2001 (GB) .................. 0131084.6
May 31, 2002 (FR) .................. 02 06679

(51) Int. Cl.
*E21B 29/02* (2006.01)
*E21B 43/24* (2006.01)

(52) U.S. Cl. ................. 166/242.2; 166/77.2; 138/33

(58) Field of Classification Search ............. 166/242.2, 166/242.3, 77.2; 138/33
See application file for complete search history.

(56) References Cited

U.S. PATENT DOCUMENTS

| 5,172,765 A | 12/1992 | Sas-Jaworsky et al. |
| 5,394,823 A * | 3/1995 | Lenze ................. 166/105 |
| 6,323,420 B1 * | 11/2001 | Head ................. 174/47 |
| 6,585,046 B2 * | 7/2003 | Neuroth et al. ........ 166/302 |
| 2001/0025664 A1 * | 10/2001 | Quigley et al. ........ 138/125 |
| 2004/0163801 A1 * | 8/2004 | Dalrymple et al. ...... 166/65.1 |

FOREIGN PATENT DOCUMENTS

| GB | 2 094 284 A | 4/1982 |
| WO | WO 86/03362 | 6/1986 |

OTHER PUBLICATIONS

International Search Report.
* cited by examiner

*Primary Examiner*—William Neuder
*Assistant Examiner*—Nicole A Coy
(74) *Attorney, Agent, or Firm*—Ostrolenk, Faber, Gerb & Soffen, LLP

(57) ABSTRACT

Rigid wound or reelable pipe (1) for transporting hydrocarbons having a single-walled or double-walled envelope comprising two coaxial pipes, internal (2) and external (3), respectively, separated by an annular space, comprising at least one electrical heating cable (10) capable of being subjected to an elongation of 0.5% without sustaining damage and produced, for example, in the form of a central conducting braided cable surrounded by an electrically insulating sheath. The materials comprising the cable are subjected to elastically deformation by remaining below 15% of their elastic limit and preferably below 5%.

14 Claims, 2 Drawing Sheets

PRIOR ART
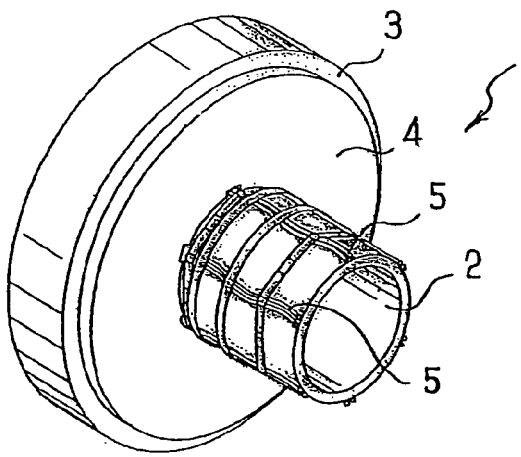
FIG_1
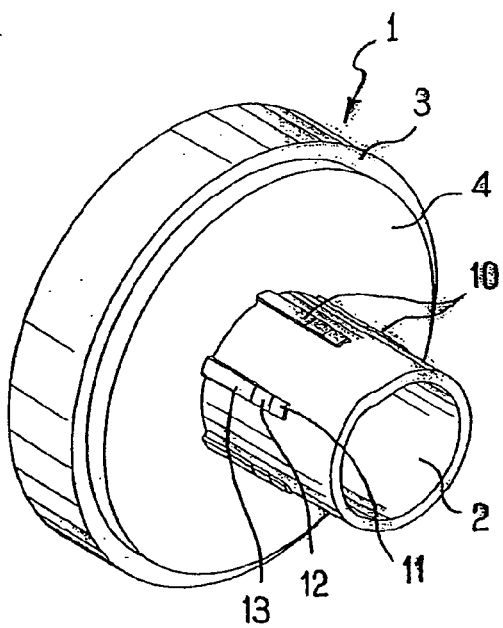
FIG_2
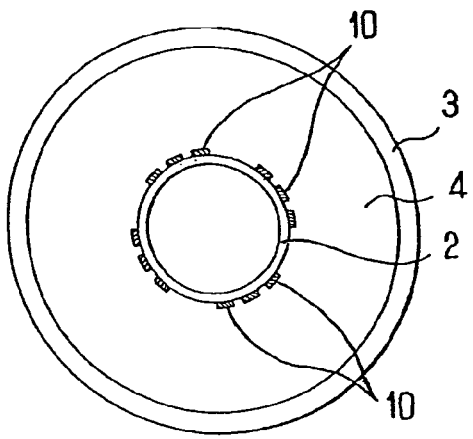
FIG_3
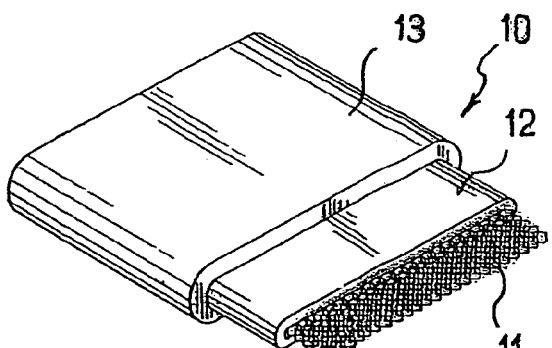
FIG_4
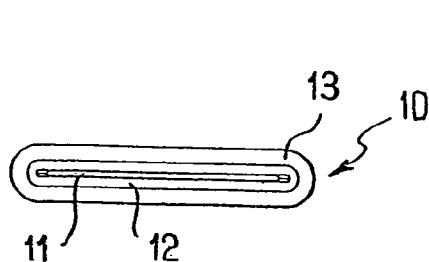
FIG_5
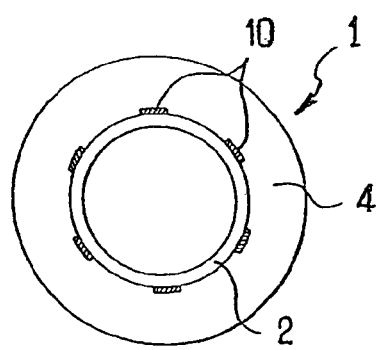
FIG_6

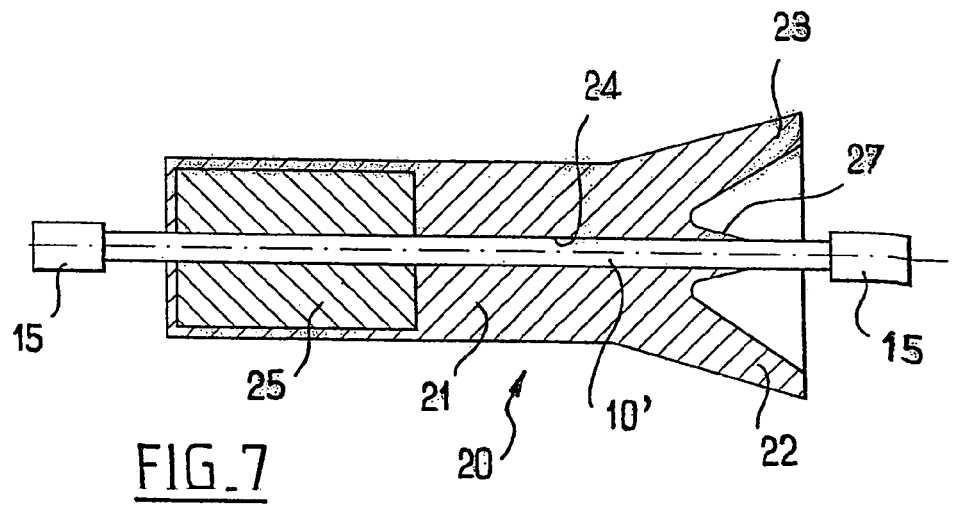
FIG_7
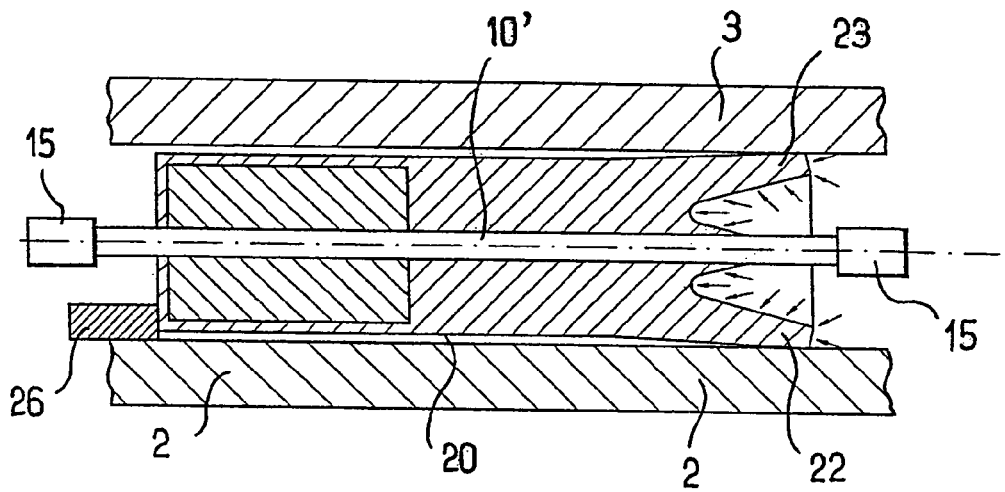
FIG_8
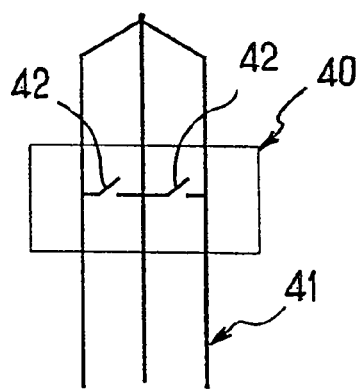
FIG_9
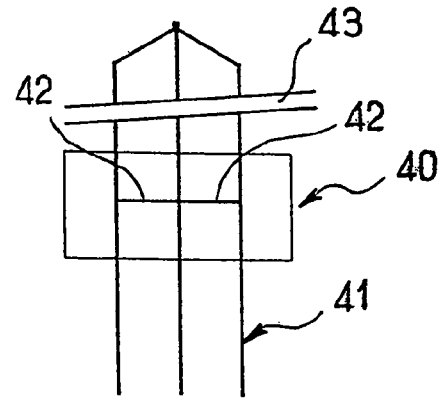
FIG_10

HEATED WINDABLE RIGID DUCT FOR TRANSPORTING FLUIDS, PARTICULARLY HYDROCARBONS

BACKGROUND OF THE INVENTION

The present invention relates to a rigid reelable heated pipe for transporting fluids such as hydrocarbons, particularly in the submarine environment.

In application associated with offshore transport pipe for hydrocarbons, there is a need for maintaining a temperature level in the pipe during service as well as during production shutdowns and re-starts. Therefore, the majority of pipes are equipped with thermal insulation means that contribute to maintaining an acceptable temperature level. However, in certain cases, the thermal insulation solution is inadequate for maintaining the required temperature level and the pipe must then be heated actively, that is to say with a heat supply which does not come from the transported fluid. This active heating solution for pipes is used in certain specific applications in conjunction with the aforesaid thermal insulation; it is particularly recommended when the pipe is subjected to prolonged periods of production stoppage.

The pipes which are concerned by the present invention are of the rigid type, as opposed to pipes of the flexible type. Laying a pipe or a rigid pipe on the seabed is done most frequently using a laying vessel. The laying is called S laying when the pipe has the shape of an S between the laying vessel and the seabed and it is called J laying when the pipe adopts the shape of a J. In the latter case, a guide ramp or a stem is provided on the laying vessel, which ramp may sometimes be partially immersed in the water. These laying operations are described in the API (American Petroleum Institute) publication *Recommended Practice 17A,* 1987.

According to these techniques, the rigid pipe to be laid can be stored on the laying vessel in pipe sections of a given, but relatively short length; the pipe sections being connected together as they are laid. According to another solution, so-called rigid unreeled, suitable also for pipe-in-pipe pipes, the pipe is manufactured in long lengths on land and reeled onto a storage reel located on the laying vessel; the pipe is then unreeled from said reel during the laying operation. It is this latter type of rigid pipe, but capable of being wound on large diameter reels, to which this invention relates to. The rigid unreeled solution has certain advantages relative to the J or S laying: the laying operations are faster, since the pipe is already assembled on land, even if, in return, loading of the laying vessel and manufacturing (assembly of the pipe) are substantially longer operations. Furthermore, the pipe manufacturing on land (welding, checking) is done in better conditions.

The reelable rigid pipes of the invention are of two types: single envelope and double-walled envelope, respectively. A single envelope pipe comprises a unique tube used for transport. In order to limit thermal exchange with the outside, a single envelope pipe generally comprises an external insulating covering around the pipe. A double-walled envelope pipe, commonly called a pipe-in-pipe in the petroleum industry, comprises two coaxial pipes, inside and outside, respectively, separated by an annular space. The inner pipe or "flow line" is used to carry the hydrocarbons. The outer pipe or the "carrier pipe" provides an annular space that can be used for different purposes (insulation, heating, monitoring, accommodation of secondary pipes). Thermal insulation can be particularly useful for avoiding cooling of the fluid being transported and the formation of hydrates; hydrate formation being particularly associated with production stoppages; the annular space can also contain passages for various fluids (water, air, heating liquids, etc) as well as electrical cables (for heating or for carrying an electrical signal, etc.). For keeping the integrity of the pipe-in-pipe during the different operations as well as in service, auxiliary devices are used such as annular spacers, centralizers or limiters of propagation of radial deformation, for example.

Active heating systems are known for installation in the annular space of pipe-in-pipes. These systems use wound secondary pipes, for example, enabling the circulation of a heat transfer fluid or using the annular space directly for circulating a heat transfer fluid. Other ones use electrical energy directly (GB 2,084,284) or use heating electrical cables.

However, when the unreeled rigid technique is used, the pipe must be wound in advance onto a reel; the active heating systems using heating cables cannot be used due to the elongation or stretching stresses present on the extrados of the pipe and the compression present on the intrados. The solution to this problem is thus in laying down the cables used with a longer length (overlength) so that they endure the elongation or stretching.

In order to do this, the cables can be disposed in waves (sinusoidally, as represented in the annexed FIG. 1, which shows the cables 5 disposed in waves over the inner pipe of a pipe-in-pipe 2, 3 and thermal insulation 4) or they can be wound in coils around the inner pipe. They can also be wound using another known method, that being the S/Z process.

An approximate solution whose object is to enable flexion of a single envelope pipe is proposed by WO 86/03362. In that application, the cable is disposed in a sinusoidal wave of very low amplitude and low period (frequency) in order to sustain elongation or compression when the pipe is flexed.

The solutions provided up to now have their drawbacks: increasing the length of the cable, increasing electrical resistance (increasing the power required for heating), increasing the costs of manufacturing (S/Z reeling machine, or helical or attaching the cables to the inner pipe by the use of adhesives, wave solution), difficulty in positioning the cable which runs the risk of detaching the inner pipe, reducing the heating system's effectiveness no matter what solution is chosen.

Another drawback is the problem bound to the thermal insulation and its installation in connection with the cables (the width of the grooves made to enable the disposition in wave form of the cables reduces the amount of insulator that can be placed in the annular space).

SUMMARY OF THE INVENTION

The object of the invention is to provide a single-walled or double-walled-walled envelope reelable rigid pipe, heated by cables, which eliminates the aforesaid drawbacks. Said object is achieved by the invention by virtue of a single-walled or double-walled-walled envelope reelable rigid pipe comprising at least one heating electrical cable, characterized in that the cable is capable of undergoing an elongation of at least 0.5% without being damaged, by means of which it may take the deformation of the pipe extrados when it can take on curvatures when being reelable onto the reel or at the time of laying.

It is thus possible and advantageous to position the heating cable(s) parallel to the longitudinal axis of the pipe and particularly along one or a plurality of the inner pipe surfaces.

In this manner, the cable is easy to install on the pipes without the need to use complicated machinery such as coilers or the like. Moreover, this rectilinear disposition of the cable is also advantageous by reason of the numerous accessories that are used in the pipe-in-pipe. Thus, installation of the centralizers, the bulkheads or waterstops as well as their implementation is facilitated by the ease of installation of the heating cable and their longitudinal rectilinear layout. In a pipe-in-pipe, the cable of the invention permit advantageously to use an annular space with a more compact thermal insulator.

On the one hand, because of the fact that the cable is in a straight line and thus shorter than in the solution where it is undulating, the decrease in length involves a proportional reduction of electrical resistance of the system and thus an increase in power for a given voltage or the possibility of equipping a longer pipe using the same voltage.

Advantageously, the cable is also capable of bearing the compression, while remaining in contact with the inner pipe. Thus, on the intrados, the heating cable does not tend to detach from the pipe.

Advantageously, a flat heating cable is used, providing greater efficiency of thermal transfer.

The cable is advantageously a plaited cable, comprising a central conducting braid of elongated elements, surrounded by at least one electrically insulating sleeve and preferably two.

Preferably, the materials constituting the cable are subjected to elastic deformation remaining under 15% of their elastic limit and preferably below 5%. By materials comprising or constituting the cable is meant the sheaths and the elongated elements forming the cable, since the cable bears the elongation by virtue of the reorganization (angular deflection) of said elongated elements that are very minimally stressed by the elongation of the cable.

Advantageously, the pipe according to the invention, when it is a pipe-in-pipe, comprises annular space sealing members between the coaxial pipes, arranged for receiving sections of the heating cable.

Advantageously, there are provided, at different locations on the electrical supply circuit associated with the pipe, connection boxes for locally automatically re-establishing the connection between phases in the event of breaking of the circuit.

Other advantages and features will become clearer when reading the following description of the invention with reference to the annexed drawings, wherein:

BRIEF DESCRIPTION OF THE DRAWINGS

FIG. 1 represents a perspective view of the prior art solution with the cables disposed in waves;

FIG. 2 represents a schematic perspective view of a pipe-in-pipe comprising cables according to the invention;

FIG. 3 represents a sectional view of an embodiment of the pipe of FIG. 2;

FIG. 4 is a sectional view of a heating cable applicable to the present invention;

FIG. 5 is a perspective view of the same heating cable comprised of a braided cable and two external sheaths;

FIG. 6 is a sectional view of a single envelope pipe equipped with cables according to the invention;

FIG. 7 shows a sealing member for the annular space of a pipe-in-pipe according to the invention;

FIG. 8 shows the same sealing member once installed in the annular space of a double-walled-walled envelope pipe;

FIGS. 9 and 10 illustrate a so-called smart connection box connected to the electrical supply circuit of a pipe according to the invention when on one hand it is in a state of normal operation and on the other hand the state follows an electric breakdown.

DESCRIPTION OF A PREFERRED EMBODIMENT

FIGS. 2 and 3 show a pipe-in-pipe 1 that comprises the inner pipe 2 for transporting hydrocarbons and the outer carrier pipe 3. In the exemplary embodiment shown, the annular space separating the pipes is filled with a thermally insulating material 4 disposed in the most appropriate fashion in strips, blocks, foam, etc. The devices attached to the pipe and also arranged in the annular space such as the spacers and the limiters of propagation of radial deformation (buckle arrestors) are not shown; also not represented are the connecting devices between the sections of rigid pipe. All of this is well-known of itself.

According to the invention, there is along at least one surface of the inner pipe 2 of the pipe, an electrical cable 10 chosen for its elongation capability of greater than or equal to 0.5% and capable of heating by Joule effect when appropriate current passes through it.

FIG. 2 shows a plurality of cables 10 regularly distributed on the periphery of the inner pipe. According to FIG. 3, the cables are distributed in four groups of three cables 10. This three-phase wiring system, does not need a return cable and consequently, for a given tension, a maximum thermal power is obtained. Other arrangements are also possible.

As shown in FIGS. 4 and 5, the cable 10 is comprised of a metal braid 11, made of copper for example, assuming a flattened form (that of a metal braided ribbon or that of a flattened pipe if the metal braid is tubular) comprising a core of the cable 10, surrounded by two electrical insulation sleeves 12, 13 having nonetheless good thermal conducting qualities. The insulator must be sufficiently resilient (but an elongation ratio of 2 to 4% is sufficient and this is an easy quality to obtain for a plastic material) to be able to accommodate the possible elongation of the cable on the extrados of the pipe when it is curved. Two superposed metal braids could be used to enlarge the transverse section of the heating elements.

The elongated heating elements forming the braided ribbon can be realized using bands (strips) of copper or aluminum or can be formed from copper wires covered with tin and/or nickel, for example. The braiding angle is between 30° and 60° and can be advantageously chosen to be equal to 45°. The diameter of the wires forming the braid or the thickness of the strips is between 0.05 mm and 1.5 mm. The thickness is chosen preferably to be 0.15 mm for copper wire, while for aluminum strips (flat wire), the preferred thickness is 0.4 mm. These dimensions allow a reduction of the spaces between the elongated elements in order to achieve optimal compactness of the braid while preserving good mechanical strength of the heating cable so obtained. According to one preferred embodiment of the cable, the braid is encompassed by two sheaths made of vinyl polychloride (PVC), of a thermoplastic elastomer (TPE), or of silicon rubber. The thickness of the sheaths is preferably of the order of 1 mm, the inner sheath can be thinner than the outer sheath. The inner sheath is advantageously in close contact with the braid in order to reinforce the conductive transfer of the heat from the braid to the outside of the outer sheath. The respective rigidity of the materials constituting sheaths will be selected in order to assist the resiliency return of the cable of metal braid towards the initial position.

The size of the flat heating cables (their width is advantageously between 15 and 50 mm), their number and their disposition in the annular space are chosen as a function of the specific application (the conditions of use, temperature of the fluid being transported, configuration of the field, dimensions of the pipe, etc.)

Advantageously the grooves arranged in the thermal insulator to receive the cable have a complementary form to that of the cable, thus increasing the volume of insulating material contained in the annular space relative to pipes of the same diameter using heating cables arranged in waves where the width of the grooves is larger.

FIG. 6 shows the application of the invention in a single-walled envelope pipe or pipe 2 surrounded by an insulating covering 4. The cable or cables are disposed at the periphery of the pipe 2, along the surfaces.

FIGS. 7 and 8 represent a sealing member 20 (waterstop) specially designed for pipe-in-pipe according to the invention in order to allow the passage of heating cables 10. The annular device 20 is formed from a generally conical body 21 made of plastic (polyurethane) comprising on one side two annular sealing lips, internal 22 and external 23, respectively and on the other side a rigid insert 25 of metal, for example. The side bearing this insert 25 is used to abut in the annular space on an abutment piece 26, such as a forged piece connected to the pipe 2 (or to the outer pipe) so as to assure the longitudinal positioning of the sealing member when water fills the annular space and can push the member 20 on the side equipped with lips 22, 23. These lips 22, 23 in addition to the fact that they already have the natural tendency to urge against the walls of the annular space by reason of their natural geometry that forces them to be loaded in said annular space, are subjected by the water that exerts its pressure on the member 20 of supplementary placement forces against the walls of the annular space (forces symbolized by the arrows in FIG. 8), thus reinforcing the seal. The sealing members 20 are disposed in pairs, head-to-foot, so as to stop the water in both directions. They are uniformly distributed longitudinally in the annular space of the double-walled envelope pipe 1. A plurality of sections 10' of heating cable crosses each member 20 at the level of a plurality of bore holes 24 distributed angularly on the periphery of the member according to a predefined distribution. The annular lips 27 are formed on the same side at the outlet of each hole 24 for receiving the section 10' of the heating cable. The cable sections 10' are glued in the holes 24 in a sealed manner. The cable sections 10' comprise on either side a connector 15 for connecting to the rest of the heating cable. It is possible to provide the evacuation means of heat to avoid the problems of local overheating of the heating cables on the inside of the member 20 that could involve aging or other inconvenience. Such means can comprise an inner thermal bridge established between the heating cables and a bore hole area of the member 20 for evacuating the excessive heat to the internal pipe 2.

The pipe of the invention comprises advantageously, from point to point, so-called smart connection devices. Such a device is intended for the case of damage to the pipe (for example, flooding of the annular space in the case of a double-walled envelope pipe); for maintaining the electrical connection and thus the heating over the part upstream of the pipe relative to the damage. When the pipe can be supplied electrically on both sides (presence of a supply umbilical line supplying the submarine end), these members can enable maintaining heating of the two sides of the part suffering the damage. These members can be installed between the two sealing members of one same pair described above. FIGS. 9 and 10 illustrate the concept of a smart connection box 40 arranged on the triphasic supply line 41 of a star system. In normal operation at the level of the box 40, the three phases are not connected, the switches 42 are open. In the event of break 43 of the electrical circuit, the box 40 automatically closes the switches 42 that connect the phases and re-establishes the electrical circuit on the side upstream of the damage 43. This allows maintaining heating and thus enables planning of repair of the damage with more flexibility.

The invention claimed is:

1. A rigid pipe for transporting hydrocarbons the pipe being a reelable type and being comprised of two coaxial pipes, including an inner and an outer pipe, respectively, the pipes being separated by an annular space, the rigid pipe further comprising at least one electrical heating cable extending through the pipe in the annular space and rectilinearly disposed along one external surface of the inner pipe, with thermally insulating material filling the annular space, wherein the cable is capable of undergoing an elongation of at least 0.5% without damage.

2. A pipe according to claim 1, the cable is subject to elastic deformation while remaining below 15% of an elastic limit of the material.

3. A pipe according to claim 1 wherein the cable is disposed parallel to a longitudinal axis of the pipe.

4. A pipe according to claim 1, wherein the cable is a flat cable.

5. A pipe according to claim 1, wherein the cable is a central conducting braided cable.

6. A pipe according to claim 5, wherein the braided cable is surrounded by at least one electrical insulation sheath.

7. A pipe according to claim 1, wherein the pipe is a pipe-in-pipe having coaxial pipes with an annular space between the pipes; and further comprising sealing members in the annular space between the coaxial pipes, the sealing members being configured for receiving the heating cable in sections of the cable.

8. A pipe according to claim 1, wherein the cable extends parallel to the pipe, not being longer than the pipe through which the cable passes.

9. A pipe according to claim 1, wherein the pipe has a wall and the cable is inside a space enclosed by the wall.

10. A pipe according to claim 1, wherein the pipe comprises a double-walled envelope, of two coaxial pipes, respectively an inner pipe and an outer pipe, separated by an annular space.

11. A pipe according to claim 10, wherein the cable passes between the coaxial pipes.

12. A pipe according to claim 1, the cable subject to elastic deformation while remaining below 5% of an elastic limit of the material.

13. A pipe according to claim 1, wherein the cable is capable of bearing compression without separating from the pipe.

14. A rigid pipe for transporting hydrocarbons the pipe being a reelable type and further comprising at least one electrical heating cable extending through the pipe, wherein the cable is capable of undergoing an elongation of at least 0.5% without damage, further comprising an electrical supply circuit to the cable, and connection boxes at different locations on the electrical supply circuit, for automatically locally re-establishing the connection between phases of the circuit in the event of failure of the circuit.

* * * * *